(No Model.) 2 Sheets—Sheet 1.

J. W. ROSS.
PLOW.

No. 606,490. Patented June 28, 1898.

WITNESSES:

INVENTOR
J. W. Ross
BY
ATTORNEYS.

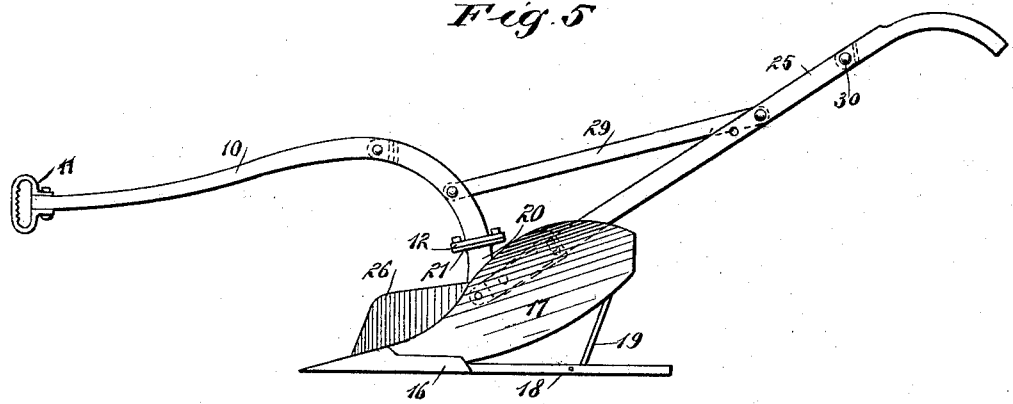

UNITED STATES PATENT OFFICE.

JESSE W. ROSS, OF NEW ORLEANS, LOUISIANA.

PLOW.

SPECIFICATION forming part of Letters Patent No. 606,490, dated June 28, 1898.

Application filed October 20, 1897. Serial No. 655,786. (No model.)

*To all whom it may concern:*

Be it known that I, JESSE W. ROSS, of New Orleans, in the parish of Orleans and State of Louisiana, have invented a new and useful Improvement in Plows, of which the following is a full, clear, and exact description.

The object of my invention is to construct a plow which may be adjusted to throw the earth simultaneously from both sides to a common center or line in covering cane or other seed or in the cultivation of plants, or may be adjusted to throw the earth from a common center or line to opposite sides of the rows of plants under cultivation.

A further object of the invention is to provide a harrow attachment and a roller attachment adapted to be used in connection with the plows when they are in position to throw the earth toward the furrow or hills in which the seed may be planted, said harrow pulverizing the earth and serving to cover the seed, while the roller serves to press the earth properly upon the planted seed.

Another object of the invention is to provide a means whereby the adjustment of the plows may be expeditiously and conveniently made and also to provide moldboards and plowshares of a construction particularly adapted to the work which the implement is intended to perform and to provide the shares and moldboards with colter-guards, and, furthermore, to so attach the harrow and roller to the plow-beams that the harrow and roller may be readily removed when not needed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
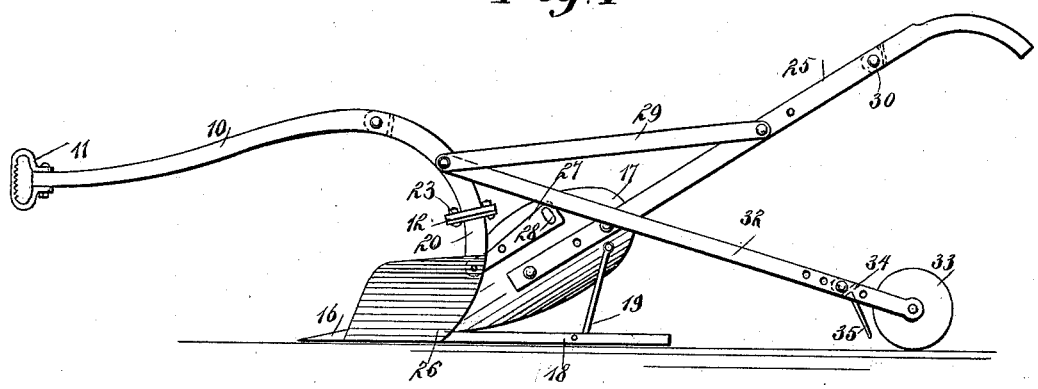
Figure 2:
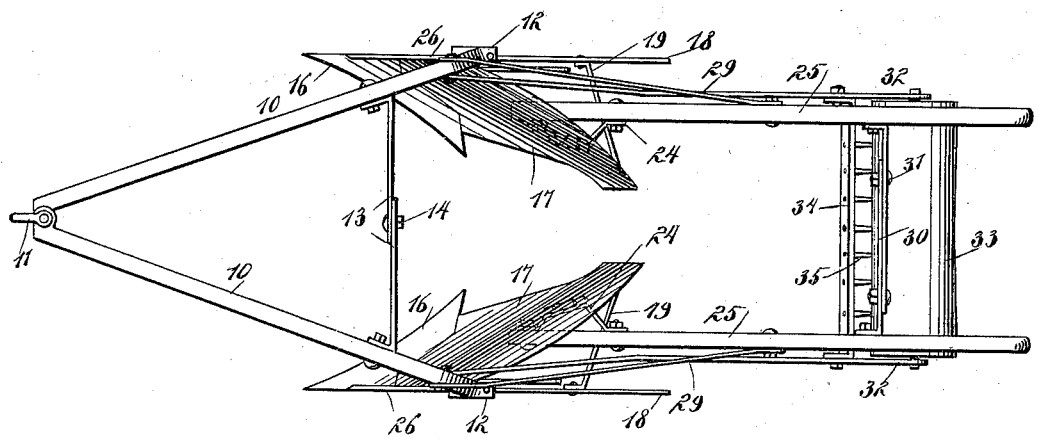
Figure 3:
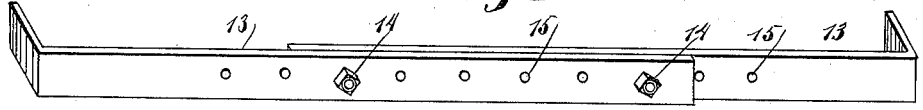
Figure 4:
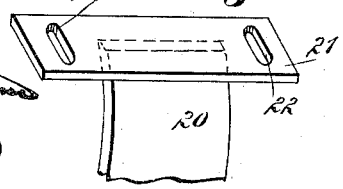

Figure 1 is a side elevation of the improved plow constructed to throw the earth in direction of the plant. Fig. 2 is a plan view of the implement constructed as shown in Fig. 1. Fig. 3 is a perspective view of an adjustable brace adapted for use between the beams or between the handles of the implement. Fig. 4 is a perspective view of the upper portion of the shank of the plow. Fig. 5 is a side elevation of the implement, the parts being in position to throw the earth from the plants; and Fig. 6 is a plan view of the implement having its parts connected as shown in Fig. 5.

Two beams 10 are employed, which are preferably connected by a hinge at their forward ends, their rear ends being made to diverge, and at the hinge connection of the beams 10 a clevis 11 is applied. The rear ends of the plow-beams 10 are curved downward and terminate at their bottom portions in plates 12. The plow-beams are adjustably connected near their rear ends by bars 13, secured at their outer ends to the beams and held to slide upon one another between the beams, the bars being held in adjusted position by one or more bolts 14, set-screws, or like devices.

In Fig. 3 I have illustrated the two bars 13 as held together by two bolts 14, the bolts being passed through registering openings 15, a series of which is longitudinally made in each bar. The plows are two in number and are interchangeable. Each plow comprises a share 16, a moldboard 17, attached to the share, and a landside 18, which is in the nature of a bar and is attached to both the share and moldboard or to the share alone, the landside being stiffened at its rear end by a brace 19, which is secured to the landside and to the convexed portion of the moldboard 17 of the plow. Each plow is provided with a shank 20, upwardly and forwardly curved and located at the landside portion of the plow. The shank 20 of each plow is provided at its upper end with a plate 21, having openings 22 made therein, and the plates 21 of the plow-shanks are adapted for engagement with the plates 12 on the beams 10, being attached thereto by bolts 23, passed through the openings 22 in the shank-plates and through corresponding openings in the plates forming a portion of the beams.

A bracket 24 is secured to the convexed side of each moldboard near its rear end, and these brackets 24 are adapted for detachable attachment to handles 25 when the plows have the convexed surfaces of their moldboards faced inward or in direction of one another, so as to throw the earth in direction of a central line drawn between the plows, as shown in Fig. 2. The moldboards are made somewhat different from the moldboards of other plows, being longer and of such shape as to cause the dirt to be thrown farther from the board than would be customary in the moldboards of ordinary plows of corresponding size. The landsides 18 of the plows are also longer than those of other plows, rendering the improved plows more steady than ordinary and causing them to run easier. The colter-guard 26 is attached at the landside of each plow to the moldboard, the share, and the shank of the plow. The purpose of attaching the colter-guard to the plowshare and moldboard is to obviate the angle which would result if attached to the beam.

Each plow is provided with a rearwardly-extending arm 27, and these arms project from the shanks of the plows back of the colter-guard, being carried rearward in a slightly-upward direction. These arms are secured to the handles when the moldboards face outwardly, as shown in Figs. 5 and 6. Each arm is provided with one or more openings 28, as shown in Fig. 1, adapted to receive bolts or their equivalents. Braces 29 are attached to the beams 10 and handles 25, being secured to the outer faces of the handles when the moldboards of the plowshares face one another and to the inner side faces of the handles when the landsides of the plow are faced inward.

The handles are adjustable to and from one another, being connected by bars 30 and set screws or bolts 31, as shown in Figs. 2 and 6, the adjustable connecting-bars of the handles being preferably of the same construction as the adjustable connecting-bars of the beams 10. (Shown in detail in Fig. 3.) When the plows are in a position to throw the earth to a central line between them, which is the position of the plows when the earth is to be cultivated at each side of the furrow in which seed is to be planted, an attachment for covering the seed and for rolling the earth over the seed is employed. This attachment consists of two arms 32, which are removably attached one to each beam 10 at its rear curved portion. The arms 32 extend rearward and downward, and between the arms at their rear extremities a roller 33 is journaled adapted to press or pack down the ground, and preferably the roller 33 is of greatest diameter at its ends or is inclined from its ends in direction of its center. In front of the roller a rake-head 34 is adjustably attached, the teeth 35 whereof extend downward and rearward, so that as the implement is drawn forward the ground will be cultivated at each side of the furrow and the earth thrown in direction of and over the furrow, while the rake-teeth 35 will act in the capacity of harrow-teeth and will level the earth over the planted seed, while the roller immediately following the rake or harrow teeth will flatten or pack the earth.

When the implement is to be used for cultivating young plants in a manner to throw the earth up around the roots thereof, the moldboards of the plowshares are made to face one another, as shown in Fig. 2, and the harrow and roller attachment are removed from the implement. When, however, the plants are to be cultivated in a manner to throw the earth from the row of plants at each side, the moldboards of the plows are made to face outward, as shown in Figs. 5 and 6. The plows are right and left, and the plow that was formerly at the right-hand side of the implement will be changed to the left-hand side, and vice versa, on occasion. Before effecting this change the brace-bars 29, connecting the handles with the beams 10, are disconnected from the handles, the bolts connecting the shanks of the plows with the beams are removed, and the connecting-bars between the handles and beams are contracted or adjusted to bring the parts they connect closer together, as shown in Fig. 6. The plows having been changed in position, so that their landsides face inward, the shanks of the plows are again bolted to the beams 10, and the rearwardly-projecting arms 27, attached to the shanks of the plows, will be bolted or otherwise secured to the handle, the brackets 24 of the moldboards remaining detached from the handles, as is likewise shown in Fig. 6. Finally the connecting bars or braces 29 are secured to the inner side faces of the handles instead of the outer side faces, as before.

The implement is exceedingly simple, it is durable and economic, and the plows may be shifted in an expeditious and convenient manner. Furthermore, the implement is particularly adapted for the purpose to which it is to be applied.

Having thus described my invention, I claim as new and desire to secure by Letters Patent—

1. The combination of two beams joined to each other at their front ends and diverging as they extend rearwardly, a plow joined to the rear end of each beam, a bracket attached to the moldboard of each plow, a handle attached to each bracket, a brace attached to each handle, the braces extending forwardly and being respectively attached to the rear portions of the beams, an arm attached to the rear portion of each beam and a roller mounted between the rear ends of the arms, the arms extending rearwardly from the plow.

2. The combination of two beams joined to each other at their front ends, the beams being separated at their rear ends, adjustably-connected bars extending between and bracing the beams, a plow removably attached to the rear end of each beam, a handle attached to the moldboard of each plow, adjustably-connected bars extending between the handles and serving to hold them rigid with each other, and braces respectively attached to the handles and run forwardly and attached to the respective beams at the rear portions thereof.

3. The combination of two plow-beams joined to each other, a plow removably attached to the rear end of each beam, a bracket attached to the moldboard of each plow, an arm attached to the shank of each plow, two handles capable respectively of being removably connected with either the arms or the brackets, and means for bracing the handles.

JESSE W. ROSS.

Witnesses:
HARRY H. HALL,
WILLIAM MAXWELL.